US008560685B1

(12) United States Patent
Deshpande et al.

(10) Patent No.: US 8,560,685 B1
(45) Date of Patent: Oct. 15, 2013

(54) PROBABILISTIC DATA STORAGE OWNER ELECTION AND REPLICATION PROTOCOL

(75) Inventors: Mayur Venktesh Deshpande, Long Beach, CA (US); Jacob Burton Matthews, Chicago, IL (US); Kasem Marifet, Costa Mesa, CA (US); James Lee Wogulis, Laguna Beach, CA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/187,456

(22) Filed: Jul. 20, 2011

(51) Int. Cl.
*G06F 15/16* (2006.01)

(52) U.S. Cl.
USPC .......................................... 709/224; 707/776

(58) Field of Classification Search
None
See application file for complete search history.

(56) References Cited

U.S. PATENT DOCUMENTS

| | | | |
|---|---|---|---|
| 5,301,290 A | 4/1994 | Tetzlaff et al. | |
| 5,414,839 A | 5/1995 | Joshi | |
| 5,550,981 A * | 8/1996 | Bauer et al. | 709/220 |
| 5,890,159 A | 3/1999 | Sealby et al. | |
| 6,108,654 A | 8/2000 | Chan et al. | |
| 6,144,983 A | 11/2000 | Klots et al. | |
| 6,362,836 B1 | 3/2002 | Shaw et al. | |
| 6,460,067 B1 | 10/2002 | Chaudhry et al. | |
| 6,606,626 B1 | 8/2003 | Ponnekanti | |
| 6,950,848 B1 * | 9/2005 | Yousefi'zadeh | 709/203 |
| 7,085,682 B1 * | 8/2006 | Heller et al. | 702/186 |
| 7,363,387 B1 | 4/2008 | Chandra et al. | |
| 7,636,677 B1 | 12/2009 | McGonigal et al. | |
| 7,768,919 B1 | 8/2010 | Conway | |
| 7,792,954 B2 | 9/2010 | Hanson et al. | |
| 8,060,880 B2 | 11/2011 | Cherem et al. | |
| 8,307,101 B1 | 11/2012 | Mui et al. | |
| 8,321,443 B2 | 11/2012 | Andrade et al. | |
| 2002/0042821 A1 | 4/2002 | Muret et al. | |
| 2003/0028631 A1 | 2/2003 | Rhodes | |
| 2003/0105756 A1 | 6/2003 | Daynes | |
| 2003/0107994 A1 | 6/2003 | Jacobs et al. | |
| 2004/0008896 A1 | 1/2004 | Suzuki | |
| 2004/0148375 A1 | 7/2004 | Levett et al. | |
| 2005/0198273 A1 * | 9/2005 | Childress et al. | 709/224 |
| 2006/0168099 A1 | 7/2006 | Diamant | |
| 2006/0274761 A1 * | 12/2006 | Error et al. | 370/396 |
| 2007/0033372 A1 | 2/2007 | Everhart et al. | |
| 2008/0040473 A1 * | 2/2008 | Larsson et al. | 709/224 |

(Continued)

OTHER PUBLICATIONS

A. Himel, "Building Realtime Insights," Building Realtime Insights—Facebook, Mar. 15, 2011, https://www.facebook.com/note.php?note_id=10150103900258920.

*Primary Examiner* — Hadi Armouche
*Assistant Examiner* — Christopher C Harris
(74) *Attorney, Agent, or Firm* — Foley and Lardner LLP; John D. Lanza

(57) ABSTRACT

Configurations providing a probabilistic ownership protocol for managing respective web property IDs (WPID) associated with incoming event tracking data communications are described. A server can determine whether an event tracking data communication with an associated WPID has an owner by checking a master ownership table. The server can register an intent to become an owner of the event tracking data communication if a minimum number of owner(s) is not met. The server then waits for a random period of time. After the random period of time, the server can check the master ownership table to determine whether the event tracking data communication has an owner or enough owners. The server can then register for ownership of the event tracking data communication by modifying the master ownership table if the event tracking data communication does not have an owner or enough owners.

23 Claims, 8 Drawing Sheets

(56) References Cited

U.S. PATENT DOCUMENTS

| | | |
|---|---|---|
| 2008/0114875 A1* | 5/2008 | Anastas et al. ............... 709/224 |
| 2009/0161594 A1* | 6/2009 | Zhu et al. ..................... 370/312 |
| 2010/0075707 A1 | 3/2010 | Fritsch et al. |
| 2010/0146110 A1* | 6/2010 | Christensen et al. ......... 709/224 |
| 2010/0169894 A1 | 7/2010 | Sheaffer et al. |
| 2010/0223244 A1 | 9/2010 | Sinha et al. |
| 2010/0318527 A1* | 12/2010 | Nandy et al. .................. 707/754 |
| 2010/0332531 A1* | 12/2010 | Galande ........................ 707/770 |
| 2011/0029581 A1* | 2/2011 | Zhao et al. .................... 707/812 |
| 2011/0107241 A1 | 5/2011 | Moore |
| 2011/0131316 A1 | 6/2011 | Ferris et al. |
| 2011/0283045 A1 | 11/2011 | Krishnan et al. |
| 2012/0311153 A1 | 12/2012 | Morgan |
| 2012/0331229 A1* | 12/2012 | Sabir ............................. 711/118 |

\* cited by examiner

PROBABILISTIC DATA STORAGE OWNER ELECTION AND REPLICATION PROTOCOL

BACKGROUND

Web site analytics involves the analysis and reporting of web site traffic data to an associated publisher. A publisher is an entity that owns and/or manages a particular web site. The publisher can monitor web site analytics data related to user visits and links to the web site by using web site analytics tools provided by third parties.

Existing web site analytics data systems work well for processing a high volume of web traffic data in order to provide interactive reports over substantial periods of time with high fidelity. However, these systems incur a high level of latency from hit occurrence to hit reporting, and also do not allow reports to segment in a fine and granular time basis. Consequently, existing web site analytics data systems have difficulty in monitoring sudden spikes or drops in traffic, or for tracking, for example, a propagation of a link to the publisher's web site over a social networking site, which can typically unfold in a time period of minutes.

Furthermore, the high latency of web site analytics reporting makes it more difficult for publishers to implement web site analytics on their web sites. Because it takes a longer period of time for reports to show up, publishers also often fail to notice any erroneous deployment of web site analytics tracking code on associated web sites.

SUMMARY

The subject technology provides for peer-to-peer management of an incoming event tracking data communication. An event tracking data communication is received in which the event tracking data communication includes event tracking data for tracking an activity associated with a source of the event tracking data communication. A tracking account associated with the event tracking data communication is determined whether to have an owner. The owner includes a real-time server assigned to process incoming event tracking data communications associated with a tracking account. An intent for ownership of the tracking account is registered if it is determined that the tracking account does not have an owner. After a random period of time has elapsed, the tracking account is determined whether to have an owner. Ownership of the tracking account is then registered if it is determined that the tracking account does not have an owner.

The subject technology provides for determining whether a number of owners for a tracking account associated with a first event tracking data communication is less than a predetermined number of owners in which the event tracking data communication includes event tracking data for tracking an activity associated with a source of the event tracking data communication. Each owner includes a real-time server assigned to process incoming event tracking data communications associated with the tracking account. An intent for ownership of the tracking account is registered if the number of owners is less than a predetermined number of owners. A second event tracking data communication is then received before a first random period of time has elapsed in which the tracking account is associated with the second event tracking data communication. A second random period of time is determined in order to wait from a remaining period of time of the first random period of time. After the second random period of time has elapsed, the subject technology determines whether the tracking account has less than the predetermined number of owners. Ownership of the tracking account is registered if it is determined that the tracking account has less than the predetermined number of owners.

Another aspect of the subject technology provides for determining whether a tracking account associated with an event tracking data communication has a minimum number of owners in which the event tracking data communication includes event tracking data for tracking an activity associated with a source of the event tracking data communication. Each owner include a real-time server assigned to process incoming event tracking data communications associated with the tracking account. An intent for ownership of the tracking account is registered if it is determined that the tracking account does not have the minimum number of owners. After a random period of time has elapsed, the subject technology determines whether the tracking account has an owner. Ownership of the tracking account is registered if it is determined that the tracking account does not have an owner.

The subject technology further provides a system for peer-to-peer management of incoming event tracking data communications. The system includes a parser module configured to parse web site tracking data included in an event tracking data communication to extract real-time analytics data in which the event tracking data communication includes event tracking data for tracking an activity associated with a source of the event tracking data communication, and the source is a web site. The system also include an ownership module configured to determine whether the extracted real-time analytics data has an associated owner in which the associated owner includes a real-time server assigned to process incoming event tracking data communications associated with the web site. The system includes a request router module configured to route the web site tracking data.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
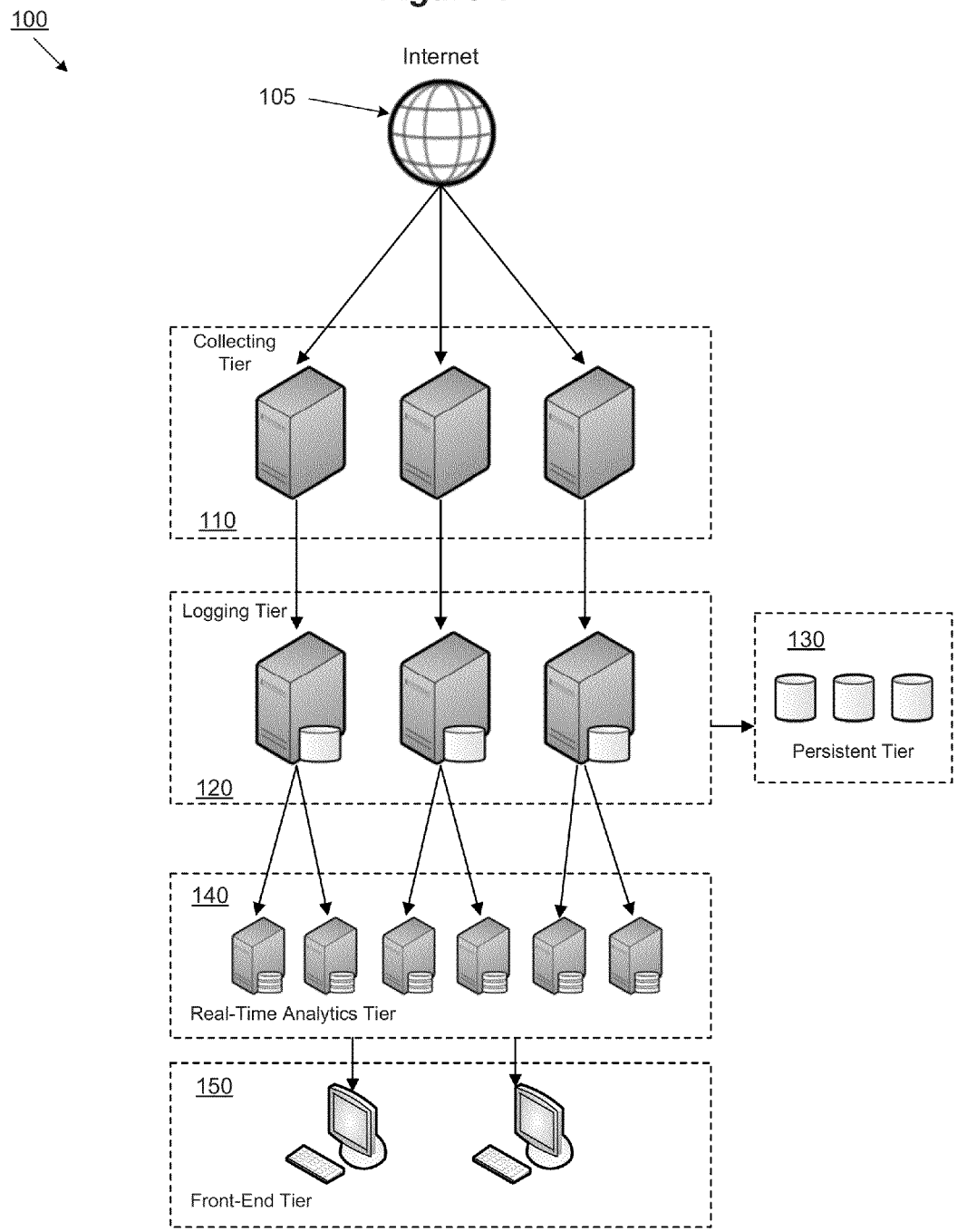
FIG. 1 illustrates an exemplary architecture diagram of a multi-tiered real-time analytics system of some configurations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Current analytics systems provide for aggregating and reporting of web site traffic data with high latency that can range from several hours to over a day. To address issues with high latency, a real-time analytics system for receiving and reporting web site traffic data with low latency is provided. In particular, a tier of real-time servers can be provided to aggregate and report incoming web site traffic data with low latency. In some implementations, each real-time server can be assigned ownership of an associated website for a respective incoming event tracking data communication. In this manner, the real-time server receives all incoming event tracking data communications for that associated web site.

Typically, a master election protocol can be utilized to determine a single real-time server that manages a master ownership table identifying the owners of respective websites. The term "owner" as used herein can be understood in the context of assigning one or more respective real-time servers to process incoming event tracking data communications associated with a particular web site (e.g., this can be determined based on a particular web property identity associated with the web site). However, current implementations of the master election protocol are not suitable for meeting the low latency requirements of a real-time analytics system. To provide low-latency performance for maintaining the master ownership table, the subject technology is directed to a probabilistic ownership protocol for implementing a peer-to-peer architecture for managing respective web property IDs (WPID) associated with incoming event tracking data communications. For instance, by utilizing a peer-to-peer architecture, several real-time servers can manage respective WPIDs in a distributed manner that provides increased scalability, fault tolerance and meets the low-latency requirements of a real-time analytics system.

In some implementations, when an incoming event tracking data communication is received, a logging server routes the event tracking data communication to an arbitrarily selected real-time server. Alternatively to an arbitrary selection, the logging server can utilize other criteria for selecting a real-time server. For instance, a "closest" real-time server can be selected based on a predetermined metric(s) such as geographical distance, a number of network hops, or latency time, etc. In some instances, a real-time server can be selected based on a holistic "follow the sun" approach, such as determining whether a real-time server located in a different geographical location is underutilized and then selecting that server to receive the event tracking data communication.

Upon receiving the event tracking data communication, the real-time server checks a master ownership table to determine whether an associated WPID has a predetermined minimum number of owners. In the event that the amount of owners registered to the associated WPID is less than the predetermined minimum, the real-time server registers an intent to become an owner of the WPID. The real-time server then sleeps for a random amount of time (e.g., 5 seconds). During the elapsed time, the real-time server acts as if it is the owner of the WPID and accumulates any incoming event tracking data communications for that WPID. After the time has elapsed, the real-time server, determines whether there are any owners or enough owners for the WPID, and registers for ownership of the WPID in the event any of those conditions fail.

In the event that the WPID has at least one registered owner when receiving an incoming event tracking data communication, the real-time server then forwards the event tracking data communication to a registered owner. In some implementations, at least two registered owners are associated with each WPID. After a first registered owner receives the event tracking data communication, the event tracking data communication is then forwarded to a second registered owner by the first owner. The second owner then processes the incoming event tracking data communication in the same manner described above. In this manner, tracking data associated with each WPID is replicated across multiple real-time servers in a real-time analytics data system.

To use a web site analytics data system, a publisher typically provides tracking instructions embedded in the web site's web pages (alternatively or conjunctively, by providing code in its web page that requests the tracking instructions from an analytics server). Typically, the tracking instructions are a small region of JavaScript™ code that the publisher includes in each page of the publisher's web site for which traffic is to be tracked. When a web page is rendered by a user device and/or client (e.g., web browsers, mobile devices, tablet devices, thin clients, thick clients, etc.), the tracking instructions are executed, which collects visitor data and sends it back to a real-time analytics server in the form of an event tracking data communication for processing. One method of sending the event tracking data communication is to send it as part of a Hypertext Transfer Protocol (HTTP) request.

Web site traffic data can be in the form of the aforementioned event tracking data communications (e.g., Hypertext Transfer Protocol (HTTP) requests that are generated from various user devices and/or clients). Each event tracking data communication can be triggered upon loading of a web page or resource (e.g., image file, banner ad, audio file, etc.) on the web site by a particular visitor to a publisher's web site. For the purpose of web site analytics reporting, the associated web site tracking data (e.g., included in associated HTTP requests) can include a web property ID (e.g., an account identifier that identifies a publisher's analytics account of a particular web site), visitor identity data (i.e., corresponding to a particular user session), an event statistic(s) (such as a timestamp of the current web page communication), and user data such as location data (i.e., geographical information) associated with the visitor to the publisher's web site. The amount and types of events/information that are reported in the tracking data can be specified by the publisher (e.g., to account for particular information that a publisher wishes to track as web site analytics data).

Although an event tracking data communication is described as including web site traffic data, an event tracking data communication is not limited to including web site traffic data. In particular, an event tracking data communication can include data from any source (e.g., application, platform, etc.) that for tracking an activity associated with the source. For example, in a mobile application platform, an event tracking data communication can include event tracking data that tracks an event associated with an activity within the mobile application platform. In this example, the event tracking data associated with the mobile application platform may not include web site traffic data because the mobile application platform does not require the use of a client such as a web browser. Aspects of the multi-tiered real-time analytics system therefore can be configured to receive and process an event tracking data communication(s) including different forms of event tracking data that are outside the scope of web site tracking data.

A multi-tiered real-time analytics system as described herein can be configured to receive and process incoming event tracking data communications as described above to enable real-time reporting of web site analytics data with low latency. As used herein, the term "real-time" corresponds with reporting web site analytics data within a specified deadline by pushing/transmitting the web site analytics data through different tiers of the multi-tiered real-time analytics system. The expression "low latency" as used herein can be therefore understood as a measurement of time that covers a time period from the reception of an event tracking data communication to the real-time reporting of the web site analytics data included therein. As illustrated in FIG. 1 and described in further detail below, the flow of event tracking data goes through several tiers for real-time web site analytics processing and reporting.

A real-time system is subject to a "real-time constraint" that can impose operational deadlines from an event to a system response. Thus, a real-time system operates within constraints on response time. In the context of the multi-tiered real-time analytics system, the flow of event tracking data through different tiers of the system is required to meet deadlines in order to report the data within a specified period of time (e.g., in a real-time manner with low latency). In one example, the real-time analytics system imposes a respective one second deadline for processing event tracking data within each tier of the system. For instance, upon receipt of an event tracking data communication, a logging server (e.g., in a logging tier described further below) must forward the event tracking data communication within a one second deadline to a real-time server (e.g., in a real-time analytics tier described below). In the event that the logging server can not meet the one second deadline, the event tracking data communication is dropped (e.g., discarded) by the logging server and no further processing occurs for that event tracking data communication. Similarly, when the real-time server receives the event tracking data communication from the logging server, the real-time server must forward the event tracking data communication to another real-time server or a front-end server (as described below) within a one second deadline. The real-time server similarly discards the event tracking data communication if it can not meet the one second deadline. The one second deadline discussed above is just one example of the specified period of time. Other periods of time may be specified. In addition, each tier of the real-time analytics system may have a different specified period of time for processing an event tracking data communication.

FIG. 1 illustrates an exemplary architecture diagram of a multi-tiered real-time analytics system 100 for receiving and reporting web site traffic data in the form of event tracking data communications. The multi-tiered real-time analytics system 100 receives such event tracking data communications from a network 105 and routes the received communications for persistent and temporary storage to enable web analytics processing by the system. The network 105 can include, but is not limited to, a local network, remote network, or an interconnected network of networks (e.g., Internet as shown in FIG. 1).

As illustrated, the multi-tiered real-time analytics system 100 may further include a collecting tier 110, a logging tier 120, a persistent tier 130, a real-time analytics tier 140 and a front-end tier 150. Each of the aforementioned tiers can include a respective cluster of servers/computers that perform a same set of functions in a distributed and/or load balanced manner. A cluster can be understood as a group of servers/computers that are linked together to seamlessly perform the same set of functions, which can provide performance, reliability and availability advantages over a single server/computer architecture. For the sake of simplicity, each illustrated tier depicts several number of servers. However, one of ordinary skill in the art would realize that the illustrated tiers could include any number of servers and still be within the scope of the subject technology. The descriptions of the various tiers of the system 100 are explained in further detail below.

In some configurations, the collecting tier 110 receives incoming event tracking data communications from the network 105. The collecting tier 110 includes at least one collecting server that is configured to receive and forward the event tracking data communication. Each collecting server of the collecting tier 110 can process an incoming event tracking data communication to determine a particular server in the logging tier 120 to route the event tracking data communication. In some implementations, the collecting server can utilize a load balancing technique to determine which logging server in the logging tier 120 to route the event tracking data communication. The load balancing technique can be based upon different factors such as server load, network load, and/or any other suitable computing metric for measuring resource utilization at a particular server.

The logging tier 120 can receive a routed event tracking data communication from a particular collecting server of the collecting tier 110. Upon receiving the event tracking data communication, the subsequent tasks of the logging tier 120 can be understood as being two-fold: 1) route received event tracking data communications to the persistent tier 130 for persistent storage and 2) route received event tracking data communication to the real-time analytics tier 140 for temporary storage.

To accomplish the aforementioned tasks, the logging tier 120 includes at least one logging server that is configured to receive the routed event tracking data communication from the collecting server. In some implementations, the logging server aggregates incoming event tracking data communications and then periodically routes the aggregated event tracking data communications to the persistent tier 130 for persistent storage. Each event tracking data communication is associated with a particular web site of a publisher and the aggregated event tracking data communications can originate from disparate associated web sites and/or the same web site. In some implementations, the logging server can be further configured to verify each routed event tracking data communication to guarantee delivery of the event tracking data communications to a particular long-term storage server in the persistent tier 130.

For persistent storage of the event tracking data communication, the persistent tier 130 of some configurations can include at least one long-term storage server. Each long-term storage server includes a non-volatile storage device(s), a database(s), or other similar non-volatile storage medium for persistent storage of an incoming event tracking data communication. Persistent storage as used herein can be understood as referring to a type of non-volatile storage that stores the event tracking data in a reliable manner. In some configurations, persistent storage can include lossless or near-lossless storage in which the data is stored without being deleted and/or replaced at a subsequent time period. Additionally, persistent storage can be characterized as storing event tracking data in a form of historical records so that the system can extract the stored tracking data at a later period of time. In some configurations, the stored event tracking data can be modified at a later time period. Alternatively, the stored event tracking data can be in the form of immutable records (i.e., data that is not modified after being stored).

To improve the reliability of the persistent storage, some implementations of the persistent tier 130 can replicate the stored event tracking data across another long-term storage server so that the tracking data is mirrored in at least one other long-term storage server. For instance, the long-term storage server that receives a particular event tracking data communication can then undergo a replication process (either initiated by the long-term storage server itself, a second long-term storage server, or another server in the multi-tiered system) to copy (i.e., replicate) the particular event tracking data to another long-term storage server. Data redundancy can therefore can be provided to enable fault tolerance in the event the data stored at one long-term storage server is corrupted and/or lost.

To meet the low latency requirements for a multi-tiered real-time analytics system, the system can employ a lossy scheme for reporting web site traffic data in which some loss of event tracking data is tolerated. In particular, because the event tracking data is stored in persistent storage as described above, the multi-tiered real-time analytics system can adopt certain trade-offs for the sake of minimizing latency when routing the event tracking data to the real-time analytics tier as described further below.

Each logging server of the logging tier 120 is further configured to route event tracking data communications to the real-time analytics tier 140 for temporary storage. Given the requirement of low latency (i.e., minimizing latency in the system) connected with reporting real-time analytics data, each logging server can be configured to route the event tracking data communications to the real-time analytics tier 140 at a greater frequency than routing the communications to the persistent tier 130. In some implementations, routing the tracking data communications to the real-time analytics tier 140 can be understood as occurring asynchronously with routing the communications to the persistent tier 130.

The real-time analytics tier 140 includes at least one real-time server that is configured to receive the routed event tracking data communication from the logging tier 120. The real-time server in some implementations is configured to aggregate and/or sort the event tracking data according to one or more predetermined criteria for real-time reporting of the web site analytics data to a publisher. As described before, each event tracking data communication can include visitor identity data corresponding to a user session, location data associated with the user/visitor, and a timestamp corresponding to the visitor action.

The real-time server of some implementations can process the aforementioned data to generate real-time analytics data for temporary storage. For instance, the real-time server can aggregate and sort the location data according to the timestamp of the visitor action and then temporarily store the aggregated and/or sorted real-time analytics data. One of ordinary skill in the art would appreciate that other criteria can be used for aggregating and sorting the real-time analytics data. In one aspect, the real-time server sends the aggregated and/or sorted real-time analytics data to the front-end tier 150 for reporting the real-time analytics data. Moreover, as used herein, temporary storage can be understood as providing volatile, quick access to data (in comparison to persistent storage) stored in a storage device such as volatile memory (e.g., random access memory).

Alternatively to the above, the front-end tier 150 in one aspect can run queries on the stored real-time analytics data to report to the publisher with low latency. For instance, the real-time server can be configured to process incoming queries from the front-end tier on the stored real-time analytics data. The real-time server can return matching real-time analytics data based on the queries to the front-end tier 150 for real-time presentation with low latency.

In some implementations, the system 100 includes the front-end tier 150, which includes at least one front-end server configured to report the real-time analytics data with low latency. As described above, the front-end server of some implementations is configured to receive real-time analytics data from the real-time server. By way of example, the front-end server can receive real-time web analytics data associated with a particular location (e.g., city, state, country, etc.) over a predetermined time period for presentation at a front-end interface (i.e., graphical user interface) to an end-user. One of ordinary skill in the art would understand that any set of real-time analytics data could be received for reporting the analytics data in a real-time manner.

Although the above description provides that system 100 includes several tiers, one of ordinary skill in the art would appreciate that in some configurations respective tiers could be combined to function as a single tier and still be within the scope of the subject technology. For instance, the above described collecting and logging tiers could be implemented as a single tier that perform a combined set of functions.

Moreover, to facilitate communication between the respective tiers as described above, the respective tiers can be configured to communication over a type of network, such as a local area network, a wide area network, or an interconnected network of networks (e.g., the Internet) and by using any sort of network/communications protocol (Transmission Control Protocol and Internet Protocol (TCP/IP), HTTP, etc.).

In addition, different configurations of the multi-tiered system can be organized in different ways. For instance, different tiers could be located in different geographical locations. Each geographical location can be associated with a respective data center that includes one or more servers associated with a particular tier. Alternatively or conjunctively, the respective servers in one particular tier could be located in one or more different geographical locations and/or data centers. This flexibility in organizing the multi-tiered system provides an advantage of increasing the scalability of the system to include servers across potentially disparate physical locations.

In the following section, respective exemplary processes for routing an event tracking data communication to a real-time server and processing the tracking data communication by the real-time server are described in further detail.

Figure 2:
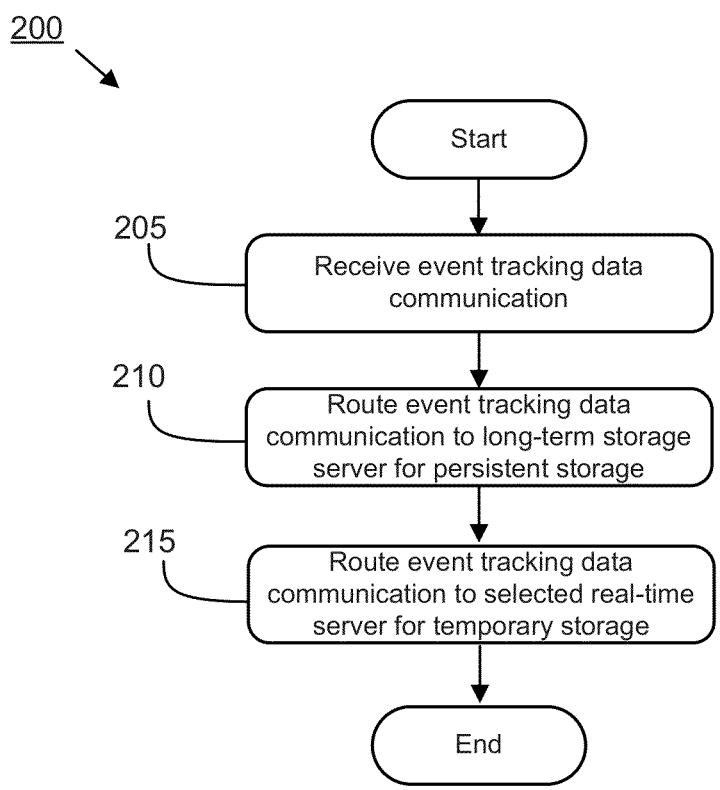
FIG. 2 conceptually illustrates an exemplary process for routing an event tracking data communication for persistent and temporary storage of some configurations.

FIG. 2 conceptually illustrates an exemplary process 200 for routing an event tracking data communication for persistent and temporary storage of some configurations. More specifically, FIG. 2 illustrates the process performed by a logging server to route event tracking data communications to a persistent tier and to a real-time analytics tier. The process 200 of FIG. 2 will be described by reference to corresponding portions of FIG. 1.

The process 200 starts when an event tracking data communication is received at 205. By reference to FIG. 1, the logging server in the logging tier 120 receives the event tracking data communication from a collecting server in the collecting tier 110. In some implementations, the logging server can receive the web site communication when pushed from the collecting server. For example, instead of the logging server utilizing a client pull technique to request an event tracking data communication, the tracking data communication is pushed as a server push from the collecting server to the logging server. Hence, the latency of receiving the event tracking data communication is decreased because the aforementioned data flow reduces the typical overhead associated with a traditional request/response communication flow.

The process 200 can then perform the task of routing the received web site to separate tiers. At 210, the event tracking data communication is routed to a long-term storage server (e.g., in the persistent tier 130 from FIG. 1) for persistent storage. Referring to FIG. 1, the logging server in the logging tier 120 routes the event tracking data communication to the long-term storage server in persistent tier 130. In some implementations, the logging server can queue several received event tracking data communications for routing the tracking data communications in a batch manner. When the logging server performs the steps in the process 200, some implementations can further verify the delivery of the event tracking data communication to the long-term storage server in order to guarantee the delivery of the communication.

The process 200 then continues to 215 to route the event tracking data communication to a selected real-time server. Referring to FIG. 1, the real-time analytics tier 140 can include several real-time servers. The logging server in the logging tier 130 can arbitrarily select a real-time server to route the event tracking data communication. By performing an arbitrary selection of the real-time server, latency in reporting real-time analytics data can be decreased because the process 200 does not rely on any particular real-time server to process the tracking data communication. The arbitrary selection of the real-time server by the process 200 also alleviates potential processing bottlenecks by impartially distributing the event tracking data communications across the real-time servers in the real-time analytics tier 140 from FIG. 1. In some configurations, the real-time server can be selected based on different criteria. For example, the logging server can select the real-time server using a randomized selection in which a particular real-time server is randomly selected from among more than one different real-time servers. In yet other configurations, the logging server can select the real-time server based on load-balancing requirements in which one or more particular computing metrics are utilized to determine the real-time server to receive the event tracking data communication.

Additionally, the process 200 at 215 can route the event tracking data communication at a greater frequency than routing the communication to the long-term storage server. For example, when the logging server receives the event tracking data communication, the logging server can queue several tracking data communications before sending them to the long-term storage server because low latency is not a factor for the aspect of the multi-tiered system dealing with persistent storage of the event tracking data. In one aspect, the logging server can immediately or in a shorter time period route the event tracking data communication to the randomly selected real-time analytics server to ensure that the requirement of low latency processing, storing and reporting of the real-time analytics data is met. After routing the event tracking data communication to the long-term storage server and the real-time server, the process 200 then ends.

Although the above description of the process 200 describes that routing to the long-term storage server occurs before routing to the real-time server, one of ordinary skill in the art can appreciate that the described order is one exemplar and some implementations could reverse the order of the previously described routing without departing from the scope of the invention. For instance, some implementations could route the event tracking data communication to the real-time server before routing the communication to the long-term storage server. In another aspect, routing the communication to the long-term storage server and the real-time server occurs in a simultaneous and/or synchronous manner.

In another aspect of the subject technology, the following description discusses an exemplary process for routing an incoming event tracking data communication to a selected real-time server based on a predetermined metric(s). As set forth in further detail below, different metrics can be utilized to determine a particular real-time server to receive the event tracking data communication.

Figure 3:
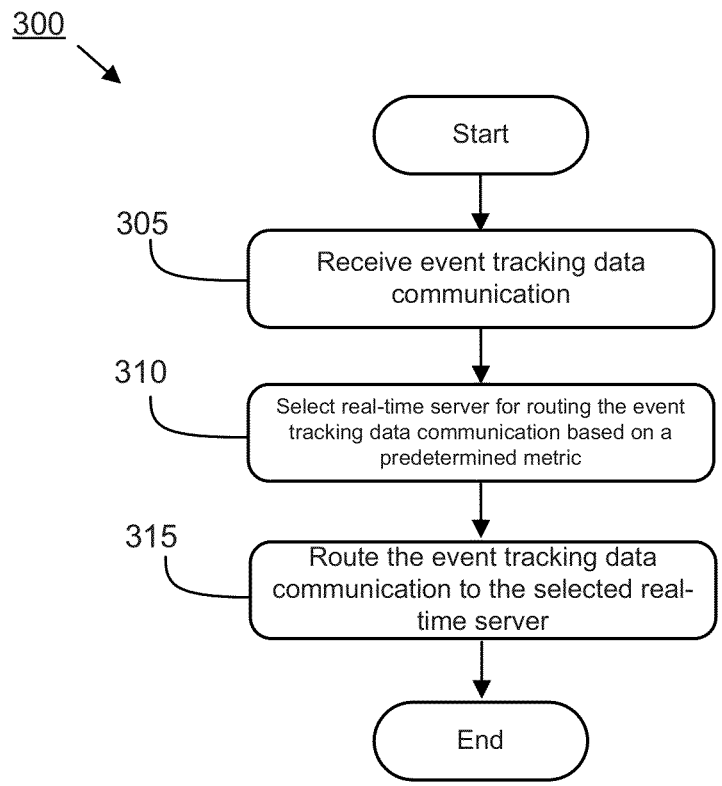
FIG. 3 conceptually illustrates an exemplary process for selecting a real-time server based on a predetermined metric of some configurations.

FIG. 3 conceptually illustrates an exemplary process 300 for selecting a real-time server based on a predetermined metric. More specifically, a logging server can implement the process 300 alternatively to the aforementioned process 200 in FIG. 2 to determine a particular real-time server to route incoming event tracking data communications for temporary storage. The process 300 of FIG. 3 will be described by reference to corresponding portions of FIG. 1.

The process 300 starts when an event tracking data communication is received at 305. By reference to FIG. 1, the logging server in the logging tier 120 receives the event tracking data communication from a collecting server in the collecting tier 110. In some implementations, the logging server can receive the web site communication when pushed from the collecting server as mentioned before.

The process 300 at 310 selects a real-time server for routing the event tracking data communication based on a predetermined metric. As used herein, the expression "predetermined metric" refers to one or more different criterion that can be used to determine an associated metric of the real-time server. Because minimizing latency in the multi-tiered analytics system is crucial in reporting real-time web site traffic data, selecting the respective real-time server that has sufficient available resources helps ensure that low latency is maintained.

To measure a respective metric of the real-time server, the process 300 in some configurations can poll the real-time server to determine a computing load of the real-time server. For instance, the logging server in FIG. 1 can immediately poll the real-time server to determine a utilization percentage of one or more of the real-time server's computing resources such as CPU usage, network usage and/or disk usage. In some configurations, the logging server can periodically poll (e.g., based on a specified time interval) one or more real-time servers in the real-time analytics tier 140 to determine each server's computing load. The process 300 therefore can utilize either the immediate and/or periodic polling scheme in order determine which particular real-time server to route the event tracking data communication.

Based on this associated metric, the process 300 can select a particular real-time server among different real-time servers in order to 1) reduce latency in reporting the real-time analytics data and/or 2) improve scalability of the multi-tiered system. One manner to accomplish the aforementioned objectives is to select a particular real-time server that is considered closest to where an event tracking data communication originated. In this manner, latency is reduced throughout the multi-tiered analytics system. In another instance, an under-utilized real-time server can be selected to improve the scalability of the system.

Referring to FIG. 1, the logging server can select a particular real-time server among other real-time servers within the real-time analytics tier 140 for routing the event tracking data communication. In one aspect, the process 300 can compare the respective associated metrics of at least two different real-time servers and then select the particular real-time server that best meets the desired set of criterion. In another aspect, the process 300 can compare the respective associated metrics of real-time servers in different data centers and/or geographical locations to select the particular real-time server.

The process 300 can use different metrics to determine which real-time server to select. The process 300 in some implementations can use a predetermined metric based on a geographical location. Referring to FIG. 1, the logging server can determine a geographical location of the real-time server to select a "closest" real-time server within the real-time analytics tier 150. In one example, the closest real-time server can be determined by a calculated distance between the logging server and real-time server based on respective geographical coordinates (e.g., longitude, latitude, elevation, GPS, etc.). In another aspect, the process 300 can use a predetermined metric based on a number of network hops calculated by tracing a route/path of a test packet/request from the logging server to the real-time server. Referring to FIG. 1, the logging server can determine a number of network hops to the real-time server within the real-time analytics tier 150. In yet another aspect, the process 300 can use a predetermined metric based on a measure of network latency to the real-time server. In this instance, the real-time server with the lowest network latency can be presumed to be the closest real-time server from the logging server. By way of example, network latency can be determined using a "ping" operation that measures a time period in which the real-time server responds to a message/request from the logging server.

Additionally, the process 300 can use a predetermined metric based on a time of day, which indicates lower web traffic at the real-time server. Given that the multi-tiered analytics system can include servers located in disparate geographical locations throughout the world, it can be understood that web traffic patterns can vary depending on the time of day with one or more peak periods (e.g., mid-morning, late afternoon, etc.). In particular, one of ordinary skill in the art would appreciate that web traffic is generally lower during the night than during the day. Therefore, to alleviate network congestion, improve the scalability of the system, and more evenly distribute processing of the event tracking data communications, the process 300 can select a particular real-time server in which its current time period is during an assumed off-peak period of lower web traffic (e.g., night time).

Although the above description of the process 300 describes that a particular predetermined metric can be utilized as a basis for selecting the real-time server, one of ordinary skill in the art would realize that several predetermined bases can be utilized in order to select the real-time server. For instance, some implementations could use a combination of geographical distance, network latency and the time of day at the real-time server to determine whether the real-time server meets a desired set of criterion for routing the event tracking data communication.

After the real-time server is selected at 310, the process 300 at 315 routes the event tracking data communication to the selected real-time server for determining ownership of the event tracking data communication. Referring to FIG. 1, the logging server in the logging tier 120 can route the event tracking data communication to the selected real-time server in the real-time analytics tier 140. As mentioned before, the logging server can employ a push technique to transmit the tracking data communication to the real-time server to minimize latency in the multi-tier real-time analytics system. In some implementations, the real-time server that receives the event tracking data communication assumes ownership of the communication, which will be described in further detail below in connection with FIG. 4. The process 300 then ends.

The following description describes an exemplary process for implementing an owner election and replication protocol. An objective of such a protocol is to assign real-time servers as owners for a particular web site in which each owner for the web site assumes responsibility for processing and storing each received event tracking data communication.

Figure 4:
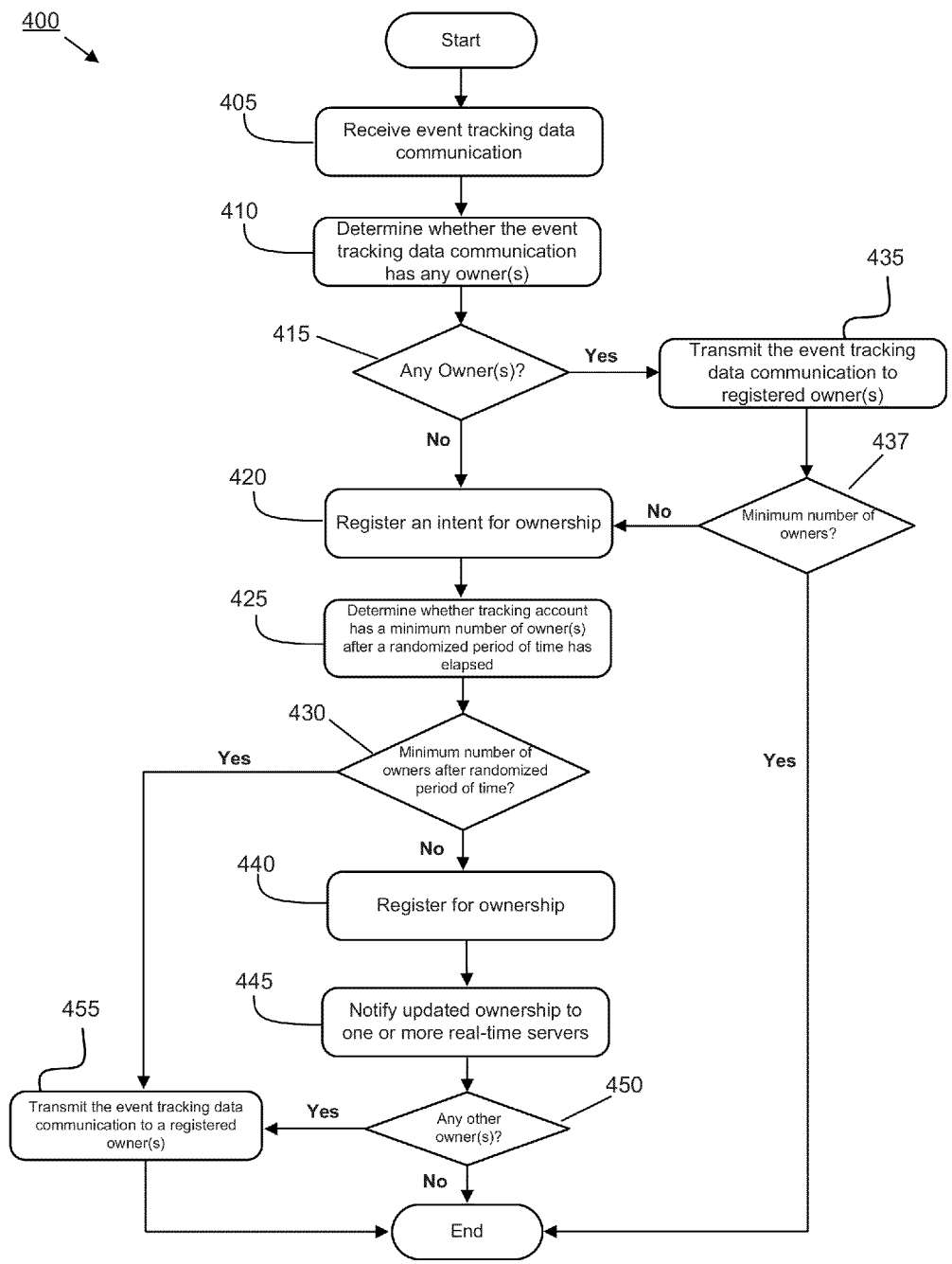
FIG. 4 conceptually illustrates an exemplary process for implementing a probabilistic ownership protocol in a real-time server of some configurations.

FIG. 4 conceptually illustrates an exemplary process 400 for implementing a probabilistic ownership protocol in a real-time server of some configurations. More specifically, a respective real-time server can implement the process 400 to perform operations for a probabilistic data storage owner election and replication protocol. In particular, the probabilistic owner election and replication protocol implements a decentralized peer-to-peer protocol in which a list of registered owners for a web site can be propagated to each real-time server within a real-time analytics tier and more than one real-time server can be assigned ownership for the web site in order to replicate the real-time analytics data. By decentralizing the list of registered owners, each real-time server forgoes relying on a centralized source for managing the registered owners list and, thus, increases the robustness of providing the registered owners list. Moreover, the replication of the real-time analytics data included with each received event tracking data communication improves the fault-tolerance of the multi-tiered analytics system in reporting real-time analytics data.

The process 400 begins when a routed event tracking data communication is received at 405 in a real-time server. For instance, the real-time server can receive the event tracking data communication when the communication is pushed from the logging server to the real-time server as mentioned before in connection with FIGS. 1-3.

The process 400 at 410 determines whether a tracking account associated with the event tracking data communication has an owner. As used herein, a tracking account can refer to an entity (e.g., web site publisher, company, user, etc.) acting as an account holder for the real-time analytics reporting provided by the real-time analytics system. A tracking account can be assigned a respective WPID that corresponds with an account holder's (e.g., publisher) web site, an application (e.g., web application), or representative of an event associated with the tracking account (e.g., such as people coming in and out of a store). For instance, the process 400 in some implementations can consult a master ownership table that includes data indicating which real-time server is associated with a particular web property ID (WPID). The master ownership table can be stored locally at the real-time server (e.g., in volatile memory) or remotely at a particular location (e.g., a remote server). Each WPID can identify an associated tracking account. In this exemplar, the process 400 can utilize the WPID as a key (e.g., that uniquely identifies each row in the master ownership table) for determining ownership of the tracking account to one or more associated real-time servers in the master ownership table. An exemplar master ownership table will be described in further detail with reference to FIG. 5 below.

Based on the determination at 410, the process 400 at 415 can decide whether an owner(s) (i.e., a particular real-time server) is associated with the tracking account's WPID. In the event that at least one owner is associated with the WPID, the process 400 continues to 435 to transmit the event tracking data communication to the respective real-time server acting as the owner of the tracking account. In some implementations, the process 400 can transmit the event tracking data communication to more than one real-time server if the determination at 410 indicates that several respective real-time servers are registered owners.

After transmitting the event tracking data communication at 435, the process 400 at 437 determines whether a tracking account's WPID associated with the event tracking data communication has a minimum number of owner(s). In other words, the process 400 determines whether a number of owners for a tracking account associated with an event tracking data communication is less than a minimum predetermined number of owners, which indicates a desired replication level that defines a minimum number of real-time servers acting as owners of the associated tracking account. For instance, the minimum number of owners can be a non-zero integer value such as 1, 2, 3, etc. In an example in which the minimum number of owners is a value of 2, a second real-time server can replicate the real-time analytics data processed by a first real-time server (i.e., the first owner of the web site) by acting as a second owner of the tracking account. If the minimum number of owners is met at 437, the process 400 then ends.

In the event that no owners are associated with the tracking acount's WPID at 415 or the minimum number of owners is not met for the web site's WPID at 437, the process 400 at 420 registers an intent for ownership of the web site. In some configurations, the process 400 registers the intent for ownership by setting a flag or attribute (e.g., a binary value or code) that indicates that the process 400 has initiated the ownership protocol for the tracking account.

Upon registering the intent for ownership of the tracking account, the process 400 can sleep/wait for a randomized period of time. The process 400 can determine a randomized period of time by utilizing a random number generator based on any suitable algorithm to generate a random number (e.g., linear congruential generator, lagged Fibonacci generator, Blum Blum Shub, Fortuna, Mersenne twister, etc.). The process 400 can utilize a randomized period of time that has an upper bound (i.e., a maximum limit in which to wait) so that the randomized time period is not above the upper bound. Sleeping for the randomized period of time enables other real-time servers opportunities to attempt to register for ownership while the process 400 is sleeping. In some configurations, the randomized time period can be at least a minimal amount (e.g., a lower bound) of time that is greater than the latency (e.g., the time from the source sending the data to the destination receiving it) in which an update for ownership of the WPID is propagated to, for example, a real-time server in the real-time analytics tier 140 by reference to FIG. 1.

Given that other real-time servers can also asynchronously or simultaneously register respective intents for ownership of the tracking account, the process 400 sleeps for the random time period in order to provide a probabilistic (i.e., randomized) owner election of the tracking account. In some implementations, the process 400 (e.g., as executing on the real-time server) can accumulate incoming event tracking data communications that are received during the randomized period of time (e.g., other event tracking data communications could be received while the process 400 is waiting given the continuous flow of event tracking data traffic). By way of example, the process 400 can accumulate the event tracking data communication in a buffer or other suitable memory/storage. In this manner, the process 400 ensures that event tracking data communications are not lost or discarded while the process 400 sleeps.

For each accumulated event tracking data communication, the process 400 can determine whether a respective WPID in the subsequently received event tracking data communication matches the WPID from the initially received event tracking data communication (i.e., the WPID that the process 400 has registered an intent for ownership). If the respective WPIDs are the same, the process 400 can determine a second randomized period of time to wait from a remaining time of the current randomized period of time (i.e., the random period of time upon registering the intent for ownership of the WPID). Hence, it should be understood that the total time to wait is now equivalent to the sum of the remaining time of the current randomized period of time and the second randomized period of time. If the respective WPIDs are not the same, the process 400 continues to wait for the current randomized period of time.

After the randomized period of time (e.g., the aforementioned current or second randomized period of time) has elapsed, the process 400 at 425 determines whether the tracking account has an owner. In some implementations, the process 400 can make this determination by consulting the master ownership table. For instance, the process 400 reads the master ownership table to attempt to locate the associated WPID of the event tracking data communication and then determine whether any real-time servers have ownership of the tracking account as indicated in the master ownership table.

During the randomized period of time, the process 400 of some implementations can receive a notification of an updated ownership of a particular tracking account (e.g., by receiving an updated ownership data from a notification server that indicates another real-time server has successfully registered ownership of the tracking account's WPID). In some configurations, a notification server provides centralized management of ownership data for each registered WPID. For instance, the notification server can employ a publication/subscription model that enables each real-time server to subscribe to updates of ownership data managed by the notification server. The notification server can transmit a notification of the updated ownership data to one or more real-time servers. Upon receiving the notification of the updated ownership data, the process 400 can then update the ownership table based on the received notification of the updated ownership.

Based on the determination at 425, the process 400 can decide at 430 whether there are a minimum number of owners (e.g., the aforementioned desired replication level) after the randomized period of time. In an instance in which the minimum number of owners is met, the process 400 then continues to 455 to transmit the event tracking data communication to one or more real-time servers that are owner(s) of the WPID. The process 400 then ends.

Alternatively, in an instance in which the process 400 determines that the tracking account does not have a minimum number of owners at 425, the process 400 continues to 430 and then registers for ownership of the tracking account at 440. For instance, in an example where the minimum number of owners is two per tracking account WPID, the process 400 can register for ownership of the tracking account WPID if the master ownership table indicates that only one other real-time server is a currently registered owner. In some implementations, the process 400 can modify the master ownership table to indicate that the current real-time server is now a registered owner of the tracking account's WPID.

After registering for ownership of the tracking account, the process 400 at 445 notifies one or more other real-time servers of the registered ownership of the tracking account by transmitting the modified ownership data (e.g., the WPID and the associated owner(s)) to the aforementioned notification server, which then propagates the updated ownership data to one or more real-time servers. Alternatively, notifying one or more real-time servers of the registered ownership can be accomplished using a multicast transmission of the modified ownership data to other real-time servers. In such a multicast transmission, the process 400 simultaneously transmits the modified ownership data in a single transmission to the other real-time servers.

At 450, the process 400 determines whether any other owners for the tracking account exist. For instance, the process 400 of some configurations can read the master ownership table to determine whether any additional real-time server is associated with the tracking account's WPID other than the current real-time server. If there are any additional owners for the tracking account, the process 400 continues to 455 to transmit the event tracking data communication to one or more real-time servers that are owner(s) of the WPID. If no other owners exist at 450, the process 400 then ends.

The following discussion describes an exemplary master ownership table data structure shown in different stages. A real-time analytics server can read and modify such a master ownership data structure to perform some of the operations described above in the process of FIG. 4.

Figure 5:
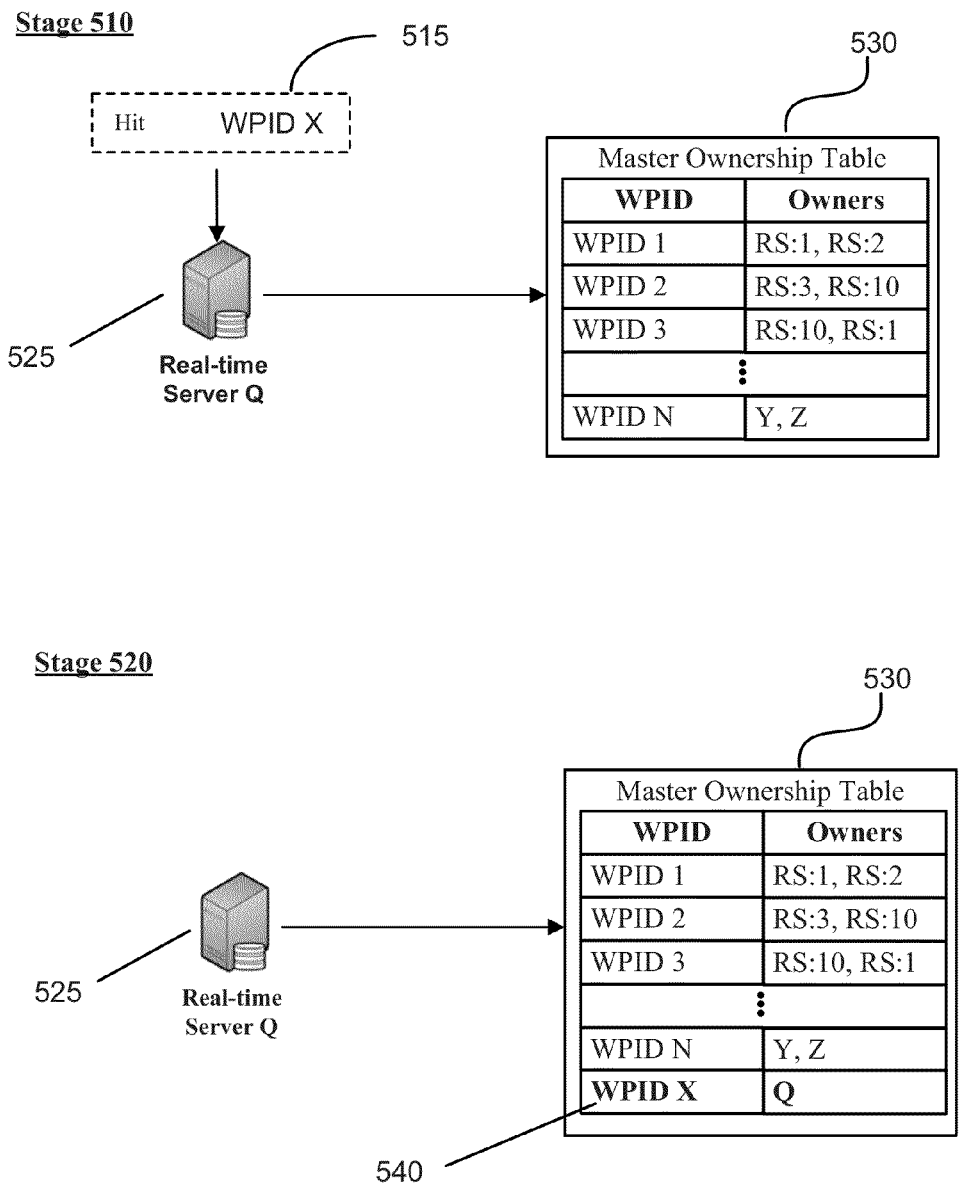
FIG. 5 conceptually illustrates an exemplary master ownership table data structure in two different stages.

FIG. 5 conceptually illustrates an exemplary master ownership table 530 data structure in two different stages. More specifically, FIG. 5 illustrates the two different stages 510 and 520 in which a real-time server 525 receives an event tracking data communication 515 and modifies the master ownership table 530 after registering ownership for an associated website WPID of the event tracking data communication. FIG. 5 will be described below with reference to portions of process 400 in FIG. 4.

As shown in the first stage 510, the real-time server 525 ("Real-time Server Q") receives the event tracking data communication 515. Referring to FIG. 4, the process 400 receives an event tracking data communication at 405. In FIG. 5, the event tracking data communication 515 is illustrated with a "WPID X" indicating that the event tracking data communication is associated with a particular tracking account X. At 410-420 in FIG. 4, the process 400 can then determine whether the event tracking data communication has an owner according to the master ownership table.

The real-time server 525 can read the master ownership table 530 in FIG. 5 to perform the aforementioned operations from the process 400 to determine an existing owner of the event tracking data communication based on the associated WPID. As depicted, the master ownership table 530 includes a first column of respective WPIDs from I to N and a second column of one or more associated owners for each WPID. Each row in the master ownership table 530 therefore includes a respective WPID (i.e., first column) and one or more associated owners (i.e., second column). For instance, a "WPID 1" is shown to have two different owners "RS:1" and "RS:2" that represent different real-time servers. The first stage 510 shows that the event tracking data communication 515 does not have any registered owners for "WPID X." Referring to FIG. 4, in this instance, the process 400 at 420-440 can perform operations to register an intent for ownership and then register for ownership of the tracking account represented by "WPID X" after the randomized time period has elapsed. As previously described above in connection with FIG. 4, the process 400 in some configurations registers the intent for ownership by setting a flag indicating the intent for ownership.

The second stage 520 depicts the modified master ownership table 530 after the real-time server 525 has registered for ownership of the tracking account represented by "WPID X." In particular, the second stage 520 shows that the master ownership table 530 includes a row 540 with respective columns for "WPID X" and its associated real-time server 525 "Q" as the registered owner.

Although the above discussion of FIG. 5 describes that the master ownership table as a data structure organized as rows and columns, one of ordinary skill in the art would understand that another suitable data structure could be used to implement a similar master ownership data structure. For instance, in some implementations, multiple respective tree data structures (i.e., a "forest") could be used to indicate ownership of respective tracking accounts in which each respective root node per tree represents a particular tracking account WPID and any corresponding child nodes are associated with respective real-time servers.

The following section describes exemplar attributes and data structures of the real-time analytics data. An associated real-time server can temporarily store such attributes and data structures illustrated in FIG. 6 for reporting real-time analytics data.

Figure 6:
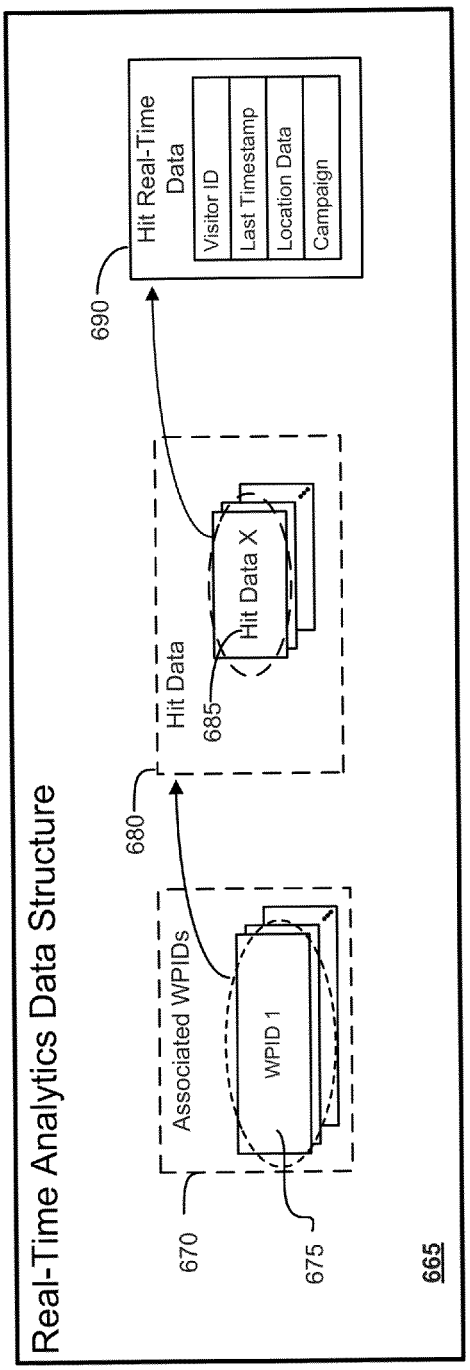
FIG. 6 conceptually illustrates various attributes and data structures that are included in some configurations of the multi-tiered real-time analytics system.

FIG. 6 conceptually illustrates different attributes and data structures that are included in some configurations of the multi-tiered real-time analytics system. More specifically, FIG. 6 depicts exemplar attributes and data structures of a real-time analytics data structure 665 that are based on event tracking data communications. For instance, an event tracking data communication can include data for identifying a user session of a visitor, a location of the visitor, and other real-time analytics attributes. A real-time server can temporarily store the real-time analytics attributes and data structures shown in FIG. 6 based on the aforementioned data included in the event tracking data communication.

In some implementations, the real-time analytics data structure 665 can be understood as a container that is a collection of the various attributes and data structures based on one or more event tracking data communication(s). As shown in FIG. 6, the real-time analytics data structure 665 includes an associated web property identity (WPID) data structure 670, associated WPID attribute 675, hit data structure 680, hit data element 685 and hit real-time data attributes 690. Although these attributes and data structures are represented as included in a single data structure, some implementations can store each of the attributes and data structures in separate data structures that include any combination of data attributes. The aforementioned attributes and data structures are described in further detail as set forth below.

As illustrated, the associated web property identity (WPID) data structure 670 includes one or more associated WPID attributes. Each associated WPID attribute can represent a publisher of a web site which is associated with the real-time server. As shown, the associated WPID attribute 675 corresponds with a publisher with a "WPID 1" that represents a unique string ID for the publisher. One of ordinary skill in the art would understand that the unique string ID could be formed from any combination of alphanumeric characters and/or symbols.

In some implementations, each associated WPID attribute can include a reference to the hit data structure 680. The hit data structure 680 includes attributes for each event tracking data communication for the publisher. As shown, the hit data structure 680 includes hit data element 685 corresponding to a particular event tracking data communication "X" for the publisher corresponding with associated WPID attribute 675. The hit data element 685 is shown in more detail in breakout section 690.

As further shown in FIG. 6, the hit data element 685 can include the real-time data attributes 690 corresponding to a visitor ID, a last timestamp, location data and campaign data. The visitor ID attribute represents a unique ID string associated with a unique visitor session. The visitor ID attribute does not necessarily identify a particular end-user but instead corresponds with a particular user session on the publisher's web site. For example, the visitor ID can be a randomized identifier that is determined based on different information such as the visitor's web browser or client, the timestamp associated with the visitor's session, and/or the visitor's hostname, etc. Additionally, the location data does not identify the visitor's personal address, but is related to a geographical location (e.g., city) that can be determined based on the IP address assigned to the visitor (e.g., by an Internet service provider).

Next, the last timestamp attribute of the real-time data attributes 690 represents the most recent timestamp in which the unique visitor visited the publisher's web site. A timestamp in some implementations is a sequence of alphanumeric characters that denotes the date and/or time in which a particular event occurred. The location data attribute represents the geographical location of the unique visitor, such as a specified city, state, county, country, zip code, global positioning system coordinates, and/or geographical coordinates (e.g., latitude, longitude, elevation), etc. Lastly, the campaign attribute identifies a particular marketing campaign corresponding with a set of associated marketing activities. For instance, the associated marketing activities can respectively correspond to a set of web pages on the publisher's web site. Any visitor activity/action related to the set of web pages on the publisher's web page can then be associated with the marketing campaign. In this manner, the campaign attribute can identify the marketing campaign associated with the visitor action.

Different implementations can implement and organize the above described attributes and data structures in different ways. For instance, the real-time analytics data structure 665 of some configurations can be implemented as a collection of tree data structures, otherwise known as a "forest." In this exemplar, a root node of a particular tree corresponds with a particular WPID (i.e., publisher identity) and each direct child of the root node can represent multiple visitor nodes that are associated with respective visitors to the publisher's web site. For each visitor node, visitor specific attributes are stored. Each visitor node can have multiple direct child nodes that represent the associated visitor's actions based on a timestamp. The timestamp of the last action for the associated visitor can also be stored with the parent associated visitor node described above. Alternatively or conjunctively, certain visitor attributes can be implemented as discrete nodes, such as a node including a city identifier with respective direct child nodes corresponding to a city name and geographical coordinates (e.g., latitude, longitude, etc.).

The following section describes a software architecture of a real-time server that can implement the above described processes and data structures as a computer program running on a particular machine, such as a computer, or stored as instructions in a computer readable medium.

Figure 7:
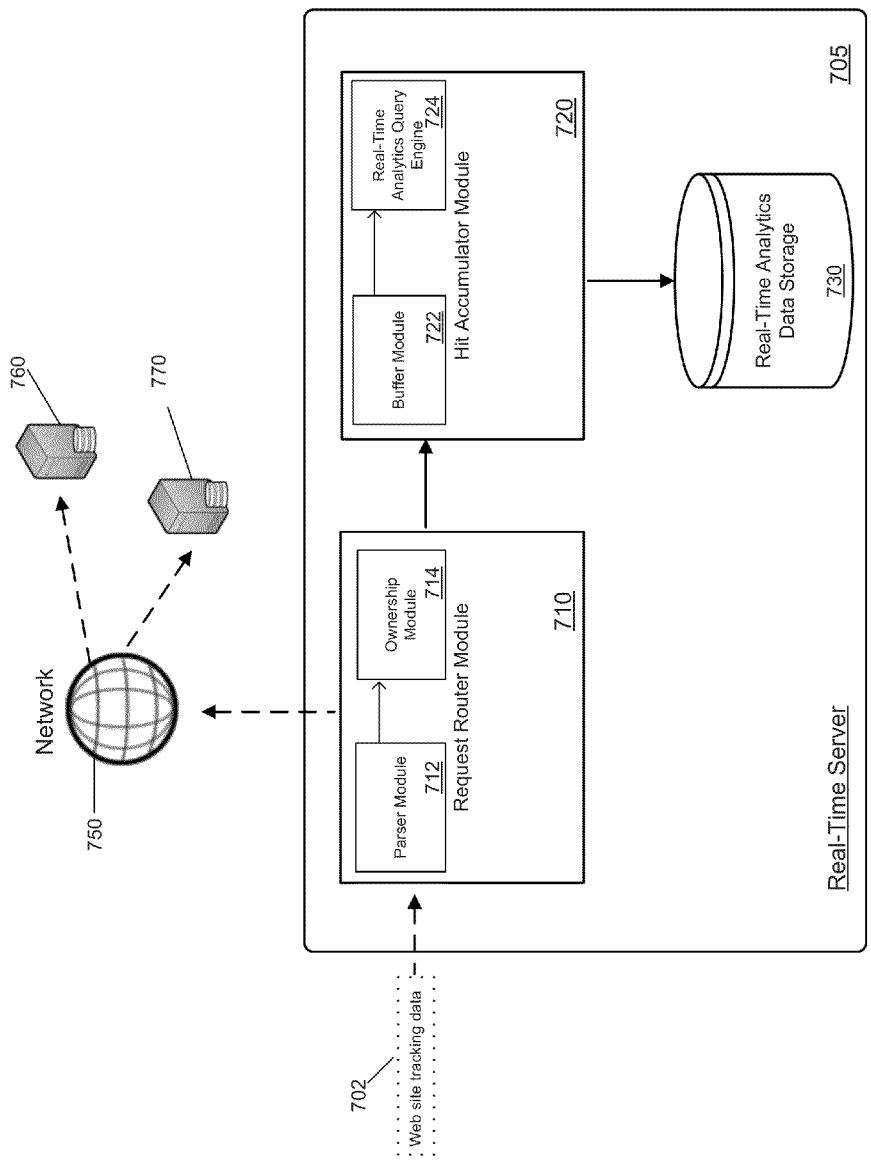
FIG. 7 conceptually illustrates an exemplary software architecture of an real-time server of some configurations.

FIG. 7 conceptually illustrates an exemplary software architecture of a real-time server 705 of some configurations. In particular, FIG. 7 shows various modules and components of the real-time server 705 for implementing the above described process in FIG. 4 and the data structures in FIGS. 5 and 6. In some configurations, the software architecture of the real-time server is part of a server-based implementation running a particular machine connected to a network.

As illustrated in FIG. 7, the real-time server 705 can include a request router module 710 for parsing and routing web site tracking data, a hit accumulator module 720 for buffering and querying real-time analytics data, and a real-time analytics data storage 730 for temporarily storing real-time analytics data. The real-time analytics data storage 730 in some implementations is a type of volatile and non-persistent storage (e.g., RAM). The operation of the aforementioned modules of the real-time server 705 are discussed in the following description.

The real-time server 705 can receive web site tracking data 702 in a request router module 710. The web site tracking data 702 can be in the form of an event tracking data communication that is received over a network 750. As shown, the request router module 710 includes a parser module 712 and an ownership module 714. The parser module 712 of some implementations can parse the web site tracking data to extract real-time analytics data and to subsequently transmit the real-time analytics data to the ownership module 714. The ownership module 714 determines a set of associated real-time servers that are owners of the web site tracking data corresponding with a publisher's web site as described above by reference to the respective process in FIG. 4 and the ownership table in FIG. 5. In an instance where the ownership module 714 determines that the web site tracking data 702 is not associated with the real-time server 705, the request router module 710 can route the web site tracking data 702 over the network 750 to other associated real-time servers. As shown in FIG. 7, additional real-time servers 760 and 770 are connected to the network 750. Alternatively, in the event that the ownership module 714 determines that the real-time server 705 is associated with the web site tracking data 702, the request router module 710 routes (i.e., sends) the web site tracking data to the hit accumulator module 720 for further processing and temporary storage.

The hit accumulator module 720 receives the web site tracking data routed from the request router module 710. In some implementations, the hit accumulator module 720 includes a buffer module 722 as shown for queuing/aggregating the web site tracking data. The buffer module 722 can be implemented in different ways. For instance, the buffer module 722 could utilize a first-in first-out (FIFO) scheme in which the earliest received web site tracking data is transferred out before later received data. In other instances, the buffer module 722 could employ a last-in first-out (LIFO) scheme that is analogous to a stack in which the later received data is transferred out before earlier received data.

As shown in FIG. 7, the buffer module 722 then sends web site tracking data to a real-time analytics query engine 724 in the hit accumulator module 720. The real-time analytics query engine 724 of some configurations performs query processing and data management of the real-time analytics data storage 730. By way of example, the real-time analytics query engine 724 can perform write and/or update operations to temporarily store the web site tracking data to the real-time analytics data storage 730. Given the requirements of low latency involved with reporting real-time analytics data, the real-time analytics data storage 730 can be implemented to provide fast access to stored real-time analytics data. In particular, the real-time analytics data storage 730 can be implemented as fast non-persistent/volatile memory that is periodically flushed and/or overwritten with more recent web site tracking data. In this manner, the overhead of managing the data in the real-time analytics data storage 730 is reduced because longevity of the data is not a primary objective.

In some implementations, the hit accumulator module 720 can execute queries for sorting and/or aggregating the received web site tracking data for temporary storage in the real-time analytics data storage 730. For instance, referring back to FIG. 1, a real-time server from the real-time analytics tier 140 can aggregate and sort the real-time analytics data according to one or more predetermined queries for temporary storage and then send the aggregated and/or sorted real-time analytics data to the front-end tier 150 for reporting the real-time analytics data. As shown in FIG. 7, the real-time analytics query engine 724 of hit accumulator module 720 can execute the queries in order to sort and/or aggregate the received web site tracking data before temporarily storing the real-time analytics data in the real-time analytics data storage 730. The real-time server 705 can then send the stored aggregated and/or sorted real-time analytics data to a front-end server for reporting and/or presenting real-time analytics data to an end-user.

The following section describes an exemplary system that implements aspects of the above described invention.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 8:
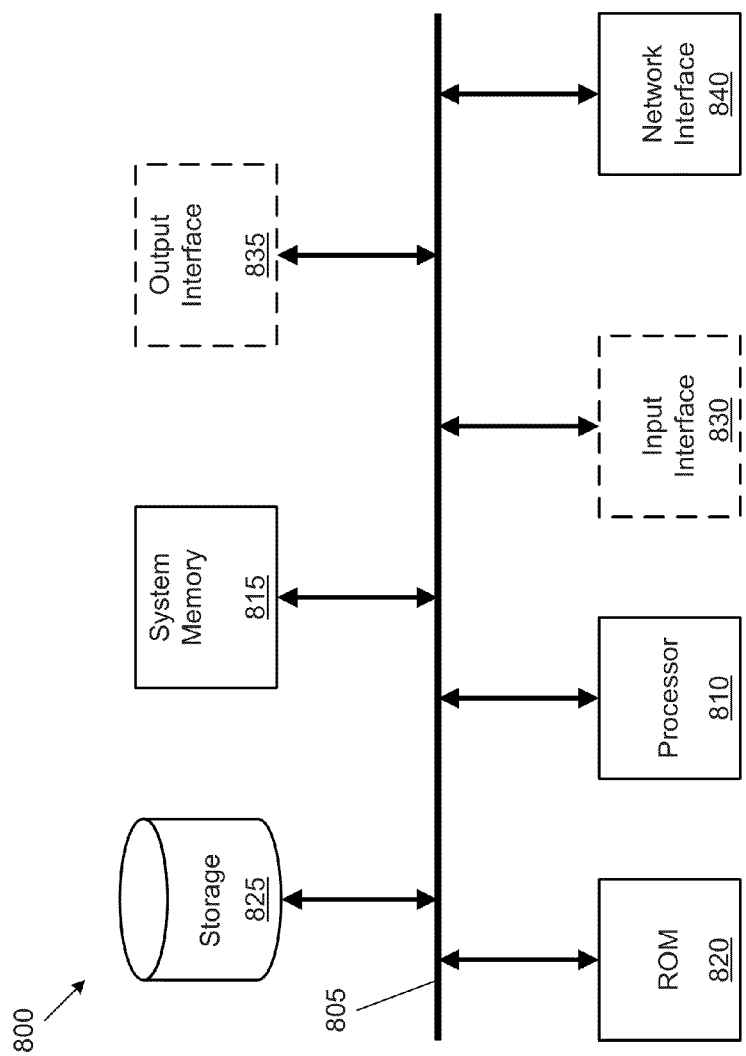
FIG. 8 conceptually illustrates an electronic system in which some configurations are implemented.

FIG. 8 conceptually illustrates a system 800 with which some implementations of the subject technology may be implemented. The system 800 can be a computer, phone, PDA, or any other sort of electronic device. Such a system includes various types of computer readable media and interfaces for various other types of computer readable media. The system 800 includes a bus 805, processing unit(s) 810, a system memory 815, a read-only memory 820, a storage device 825, an optional input interface 830, an optional output interface 835, and a network interface 840.

The bus 805 collectively represents all system, peripheral, and chipset buses that communicatively connect the numerous internal devices of the system 800. For instance, the bus 805 communicatively connects the processing unit(s) 810 with the read-only memory 820, the system memory 815, and the storage device 825.

From these various memory units, the processing unit(s) 810 retrieves instructions to execute and data to process in order to execute the processes of the invention. The processing unit(s) can be a single processor or a multi-core processor in different implementations.

The read-only-memory (ROM) 820 stores static data and instructions that are needed by the processing unit(s) 810 and other modules of the system 800. The storage device 825, on the other hand, is a read-and-write memory device. This device is a non-volatile memory unit that stores instructions and data even when the system 800 is off. Some implementations of the invention use a mass-storage device (such as a magnetic or optical disk and its corresponding disk drive) as the storage device 825.

Other implementations use a removable storage device (such as a flash drive, a floppy disk, and its corresponding disk drive) as the storage device 825. Like the storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the invention's processes are stored in the system memory 815, the storage device 825, and/or the read-only memory 820. For example, the various memory units include instructions for processing multimedia items in accordance with some implementations. From these various memory units, the processing unit(s) 810 retrieves instructions to execute and data to process in order to execute the processes of some implementations.

The bus 805 also connects to the optional input and output interfaces 830 and 835. The optional input interface 830 enables the user to communicate information and select commands to the system. The optional input interface 830 can interface with alphanumeric keyboards and pointing devices (also called "cursor control devices"). The optional output interface 835 can provide display images generated by the system 800. The optional output interface 835 can interface with printers and display devices, such as cathode ray tubes (CRT) or liquid crystal displays (LCD). Some implementations can interface with devices such as a touchscreen that functions as both input and output devices.

Finally, as shown in FIG. 8, bus 805 also couples system 800 to a network interface 840 through a network adapter (not shown). In this manner, the computer can be a part of a network of computers (such as a local area network ("LAN"), a wide area network ("WAN"), or an Intranet, or an interconnected network of networks, such as the Internet. Any or all components of system 800 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for peer-to-peer management of an incoming event tracking data communication, the method comprising:
   receiving, by a processor, an event tracking data communication, wherein the event tracking data communication includes event tracking data for tracking an activity associated with a source of the event tracking data communication;
   determining, by the processor, whether a tracking account associated with the event tracking data communication has an owner, wherein the owner comprises a real-time server assigned to process incoming event tracking data communications associated with the tracking account;
   registering, by the processor, an intent for ownership of the tracking account if it is determined that the tracking account does not have an owner;
   accumulating, by the processor, incoming event tracking data communications during a random period of time; and
   after the random period of time has elapsed, determining, by the processor, whether the tracking account has an owner, and registering, by the processor, for ownership of the tracking account if it is determined that the tracking account does not have an owner.

2. The method of claim 1, wherein the event tracking data includes web site traffic data included in a Hypertext Transfer Protocol (HTTP) request associated with the web site.

3. The method of claim 1, further comprising:
   transmitting the event tracking data communication to a registered owner of the tracking account in response to the tracking account having an owner.

4. The method of claim 1, further comprising:
   transmitting the event tracking data communication to one or more owners after the random period of time has elapsed if the tracking account has one or more owners.

5. The method of claim 1, further comprising:
   registering for ownership of the tracking account if it is determined that a number of associated owners of the tracking account is below a predetermined number of owners.

6. The method of claim 1, wherein registering for ownership of the tracking account comprises modifying an ownership table.

7. The method of claim 6, further comprising:
   notifying one or more real-time servers of the registered ownership of the tracking account by transmitting the modified ownership table.

8. The method of claim 7, wherein notifying one or more real-time servers of the registered ownership comprises a multicast transmission of the modified ownership table.

9. The method of claim 1, wherein determining whether the tracking account has an owner is based on a web property identity.

10. A machine-implemented method for peer-to-peer management of an incoming event tracking data communication, the method comprising:
    determining, by a processor, whether a number of owners for a tracking account associated with a first event tracking data communication is less than a predetermined number of owners, wherein the event tracking data communication includes event tracking data for tracking an activity associated with a source of the event tracking data communication, and each owner comprises a real-time server assigned to process incoming event tracking data communications associated with the tracking account;
    registering, by the processor, an intent for ownership of the tracking account if the number of owners is less than a predetermined number of owners;
    receiving, by the processor, a second event tracking data communication before a first random period of time has elapsed, wherein the tracking account is associated with the second event tracking data communication;
    determining, by the processor, a second random period of time to wait from a remaining period of time of the first random period of time; and
    after the second random period of time has elapsed, determining, by the processor, whether the tracking account has less than the predetermined number of owners, and registering, by the processor, for ownership of the tracking account if it is determined that the tracking account has less than the predetermined number of owners.

11. The method of claim 10, wherein the event tracking data includes web site traffic data included in a Hypertext Transfer Protocol (HTTP) request associated with the web site.

12. The method of claim 10, wherein the first and second event tracking data communications are associated with a same web property identity.

13. The method of claim 10, further comprising:
    transmitting the first and second event tracking data communications to a real-time server if the tracking account has at least the predetermined number of owners, wherein the real-time server is an owner of the website.

14. A machine-readable medium comprising instructions stored therein, which when executed by a machine, cause the machine to perform operations comprising:
    determining whether a tracking account associated with an event tracking data communication has a predetermined number of owners, wherein the event tracking data communication includes event tracking data for tracking an activity associated with a source of the event tracking data communication, and each owner comprises a real-time server assigned to process incoming event tracking data communications associated with the tracking account;
    registering an intent for ownership of the tracking account if it is determined that the tracking account does not have the predetermined number of owners;
    accumulating incoming event tracking data communications during a random period of time; and
    after the random period of time has elapsed, determining whether the tracking account has an owner, and registering for ownership of the tracking account if it is determined that the tracking account does not have an owner.

15. The machine-readable medium of claim 14, wherein the event tracking data includes web site traffic data included in a Hypertext Transfer Protocol (HTTP) request associated with the tracking account.

16. The machine-readable medium of claim 14 comprising further instructions stored therein, which when executed by the machine, cause the machine to perform further operations comprising:
   transmitting the event tracking data communication to each registered owner if the tracking account has at least one owner after the random period of time has elapsed.

17. The machine-readable medium of claim 14 comprising further instructions stored therein, which when executed by the machine, cause the machine to perform further operations comprising:
   notifying one or more real-time servers of an updated ownership of the tracking account after registering for ownership of the tracking account.

18. The machine-readable medium of claim 14, wherein the predetermined number of owners is at least two owners.

19. A system for peer-to-peer management of incoming event tracking data communications, the system comprising:
   memory;
   one or more processors;
   one or more modules stored in memory and configured for execution by the one or more processors, the modules comprising:
      a parser module configured to parse web site tracking data included in an event tracking data communication to extract real-time analytics data, wherein the event tracking data communication includes event tracking data for tracking an activity associated with a source of the event tracking data communication, and the source is a web site;
      a buffer module configured to accumulate incoming event tracking data communications during a random period of time;
      an ownership module configured to, after the random period of time has elapsed, determine whether the extracted real-time analytics data has an associated owner, wherein the associated owner comprises a real-time server assigned to process incoming event tracking data communications associated with the web site; and
      a request router module configured to route the web site tracking data.

20. The system of claim 19, wherein the event tracking data includes web site traffic data included in a Hypertext Transfer Protocol (HTTP) request associated with the web site.

21. The system of claim 19, wherein the ownership module is further configured to register an intent for ownership of a tracking account associated the event tracking data communication if a minimum number of owners is not associated with the tracking account.

22. The system of claim 19, wherein the one or more modules stored in memory and configured for execution by the one or more processors further comprise:
   a hit accumulator module configured to receive the web site tracking data routed from the request router module.

23. The system of claim 22, wherein the request router module routes the web site tracking data to the hit accumulator module in response to the ownership module determining that the system is an owner of a tracking account associated with the web site tracking data.

* * * * *